Patented Feb. 17, 1931

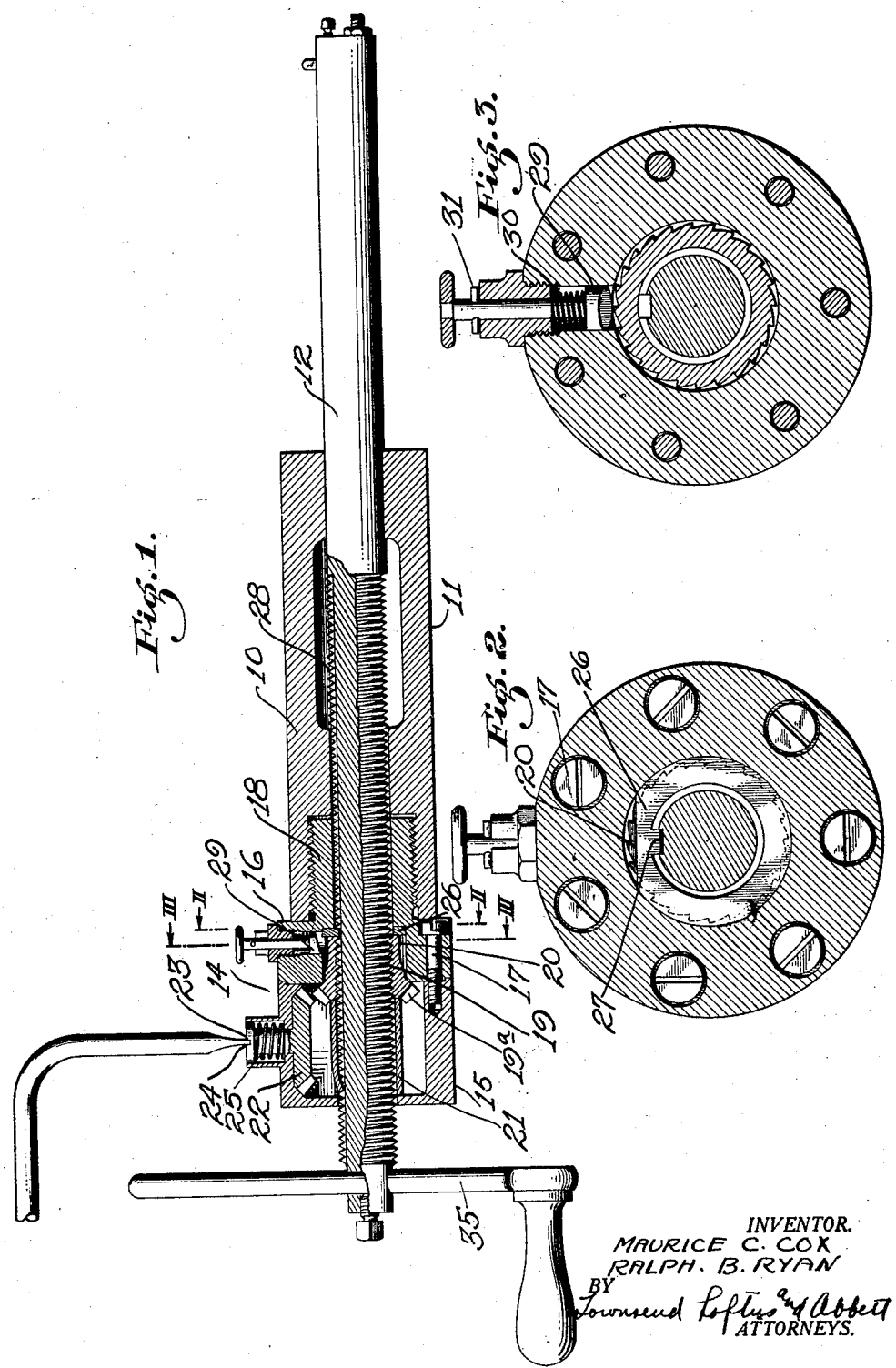

1,792,820

UNITED STATES PATENT OFFICE

MAURICE C. COX AND RALPH B. RYAN, OF OAKLAND, CALIFORNIA, ASSIGNORS, BY DIRECT AND MESNE ASSIGNMENTS, TO RYCO, INC., LTD., A CORPORATION OF CALIFORNIA

PORTABLE BORING MACHINE

Application filed March 9, 1927, Serial No. 173,815. Renewed December 16, 1930.

This invention relates to machine tools and particularly pertains to a portable boring machine.

It is the principal object of the present invention to provide a generally improved boring machine of a portable character of simple and inexpensive construction, and capable of use in boring the bearing parts of automobile engines and like devices in an expeditious and economical manner.

In carrying out this object we provide a boring bar carrying a cutting tool and upon which a feed box is mounted. This feed box is ordinarily stationarily disposed relative to the work and the boring bar is advanced or retracted therethrough upon rotation of the bar. The feed box is fitted interiorly with a feed nut threaded on the boring bar so that relative rotation between the feed nut and boring bar will advance or retract the boring bar through the feed box. This feed nut may be rapidly rotated to advance or retract the bar through the feed box rapidly, or it may be automatically operated when the bar is revolved to feed the later at a rate of speed in proportion to the speed of the bar. Also the feed box may be moved bodily toward or away from the work to obtain a hand feed, such as employed when cutting fillets.

One form which the invention may assume is exemplified in the following description and illustrated by way of example in the accompanying drawings, in which:

Fig. 1 is a longitudinal section through a portable boring machine embodying the preferred form of our invention.

Fig. 2 is a transverse section through the feed box taken on line II—II of Fig. 1.

Fig. 3 is a transverse section through the feed box taken on line III—III of Fig. 1.

Referring more particularly to the accompanying drawings, 10 generally indicates a portable boring machine which may be manually or power operated. This machine comprises a bar sleeve 11 which, when the device is in use, is held stationary. This sleeve is bored to rotatably support a boring bar 12 and guide the same. It is also employed to support a feed box 14 which is mounted on the boring bar 12.

The feed box 14 is substantially cylindrical in form and is formed in two axially aligned sections 15 and 16, which are secured together by screws 17. The section 16 is formed with an axially projecting shank 18 which is exteriorly threaded so that it may be connected to the bar sleeve 11 and held stationary relative thereto. This shank 18 is bored to rotatably engage the boring bar 12. The end of the feed box 14 opposite the shank 18 is bored in alignment with the bore in the shank 18 so as to properly guide the boring bar 12 through the feed box 14.

Intermediate its ends, the feed box 14 is formed with an enlarged bore to accommodate certain parts of the feed mechanism for advancing and retracting the boring bar 12 through the feed box 14 and bar sleeve 11. This mechanism includes a feed nut 19 which is formed with a bevel pinion $19^a$ and ratchet gear 20, and is threaded on the threaded portion of the boring bar 12. This feed nut 19 is held between one end of the enlarged bore in the box and the end of a sleeve 21 disposed between the other end of the enlarged bore and the adjacent face of the feed nut 19. Therefore, the feed nut 19 is held from axial movement relative to the feed box 14, so that relative rotation between it and the boring bar 12 will advance or retract the latter through the feed box 14.

For rapidly running the boring bar 12 through the feed box 14, I provide a bevel gear 22 mounted within the feed box 14 at right angles to the bevel pinion $19^a$ on the feed nut 19. The shaft of this gear 22 extends transversely through the wall of the feed box 14 and is formed with an enlarged head 23 having a screw driver slot 24. The bore through which the shaft of the gear 22 extends is counterbored at its outer end to slidably receive the enlarged head 23 of the shaft and to provide a chamber to receive a compression spring 25. This spring is interposed between the enlarged head 23 on the shaft of gear 22 and the feed box 14, and tends to maintain the gear 22 in its outermost position out of mesh with the pinion $19^a$ on the feed nut 19. It also permits the gear 22 to be moved inwardly toward the boring bar 12 into mesh with the pinion 19ª. In performing this operation, a crank having a screw driver end is employed to simultaneously keep the gear 22 in mesh with the pinion 19ª on the feed nut 19 and rotate it. This will rapidly run the bar 12 through the feed box 14, the direction depending upon which direction the gear 22 is revolved.

We have also provided an automatic feed for the boring bar 12 which automatically advances the bar a definite amount each time the latter is revolved one revolution. This mechanism comprises a cam ring 26 interposed betwen the end of the ratchet portion of the feed nut 19 and the end of the feed box 14. This cam ring 26 is formed with a key 27 which slidably engages a keyway 28 formed longitudinally of the bar 12. This arrangement causes the ring 26 to rotate in unison with the bar 12 but permits the bar to move axially therethrough. The exterior diameter of the ring 26 is just slightly larger than the exterior diameter of the ratchet gear 20 formed on the feed nut 19.

Extending transversely through the wall of the feed box 14 is a pawl 29. A spring 30 constantly tends to force said pawl inwardly into engagement with the teeth of the ratchet gear 20 on the feed nut 19. The face of the pawl 29 is of such a dimension that it extends across both the faces of the ratchet gear 20 and the ring 26.

At its upper end the shank of the pawl 29 is fitted with a transverse pin 31 adapted to engage slots formed in the sides of the sleeve in which the pawl 29 is guided. When engaging these slots the pawl 29 may be moved into engagement with the ratchet by the spring 30. When disengaged from the slots and bearing against the outer end of the guide sleeve, the spring is held compressed with the pawl 29 in inoperative position.

When the pawl 29 is free to engage the teeth of the ratchet gear 20, as described, it also engages the periphery of the ring 26. As this ring is larger in diameter than the gear 20, it will normally hold the pawl 29 from engaging the gear 20.

To permit the pawl 29 to engage the gear 20 for a short period during each revolution of the boring bar 12, a portion of the ring is cut away, forming a flat surface on the periphery of the ring. When this flat surface aligns with the pawl 29, the latter will be free to engage the teeth of the ratchet gear 20, and will hold the feed nut 19 stationary until the rotation of the boring bar 12 moves the flat surface out of register with the pawl 29. The latter will then be engaged by the peripheral edge of the ring 26 and moved from engagement with the ratchet gear 20, leaving the feed nut 19 free to turn with the boring bar 12.

It is therefore apparent that when utilizing the automatic feed, when the boring bar 12 is revolved that the feed nut 19 will revolve therewith during a major portion of each revolution. During the remaining portion of each revolution the pawl 29 will hold the feed nut 19 stationary while the bar 12 revolves. This, as described, will advance the bar 12 through the feed box 14 a predetermined amount during each revolution. It is preferred that the bar 12 be fed one inch to every eighty turns of the bar 12. This feed may be varied if desired.

In operation of the device the bar sleeve 11 is stationarily mounted relative to the work and the tool end of the boring bar 12 is fitted with the proper tool. The gear 22 may then be pressed into mesh with the pinion 19ª on the feed nut 19 and revolved to bring the tool into working position. At this time the pawl 29 is turned by means of the button 29ª on its shank so that the pin 31 may engage the slots in the pawl guide sleeve so that the spring 30 will be effective in moving the pawl 29 into engagement with the ratchet gear 20. The bar 12 may then be rotated by means of the crank 35. During each revolution the pawl 29 will engage the ratchet gear 20 on the feed nut 19 and hold it stationary so that the bar 12 will rotate relative thereto and advance through the work.

When cutting fillets the pawl 29 is placed in inoperative position and the feed box 14 is rotated to partially unscrew it from the bar sleeve 11. The operator then revolves the bar 12 with one hand and feeds it by rotating the entire feed box 14 with the other hand. This will move the bar 12 longitudinally relative to the bar sleeve 11 and the work.

From the foregoing it is obvious that we have provided a very simple and inexpensive boring machine which is particularly useful in reboring bearings of automobiles and like devices.

It should be stated that a pulley may be substituted for the crank 35 if desired, so that the device may be power driven.

While we have shown the preferred form of our invention, it is to be understood that various changes may be made in its construction by those skilled in the art without departing from the spirit of the invention, as defined in the appended claims.

Having thus described our invention, what we claim and desire to secure by Letters Patent is:

1. A portable boring machine comprising a feed box adapted to be stationarily held, a feed nut mounted therein, said feed nut having ratchet teeth formed thereon, a boring bar extending through the feed box and threadedly engaging said feed nut whereby the latter will normally rotate in unison with the boring bar, a spring-pressed pawl carried by the feed box and extending transversely of the boring bar, a spring engaging said pawl and normally tending to place the same in engagement with said ratchet teeth on the feed nut whereby to hold the same stationary when the boring bar is rotated to cause the latter to be advanced or retracted through the feed box, a member carried by the boring bar and rotatable in unison therewith and capable of engaging said pawl to retain the same out of engagement with the ratchet teeth during a portion of each revolution of the boring bar, bevel gear teeth formed on the feed nut, a bevel gear mounted within the feed box and adapted to be placed in mesh with the bevel gear teeth formed on the feed nut, spring means normally maintaining said bevel gear out of engagement with the bevel gear teeth on the feed nut but capable of permitting said bevel gear to be placed in mesh with the bevel gear teeth on the feed nut and revolved to feed the boring bar, said bevel gear being formed with a shaft projecting outwardly through the wall of the feed box and formed at its end with a screw driver slot whereby it may be simultaneously pressed into engagement with the bevel gear teeth on the feed nut and rotated.

2. A portable boring machine comprising a feed box adapted to be stationarily held, a feed nut mounted therein, said feed nut having ratchet teeth formed thereon, a boring bar extending through the feed box and threadedly engaging said feed nut whereby the latter will normally rotate in unison with the boring bar, a spring-pressed pawl carried by the feed box and extending transversely of the boring bar, a spring engaging said pawl and normally tending to place the same in engagement with said ratchet teeth on the feed nut whereby to hold the same stationary when the boring bar is rotated to cause the latter to be advanced or retracted through the feed box, means for retaining said pawl in an inoperative position, a member arranged adjacent the ratchet teeth and the pawl and feathered to the boring bar whereby it will rotate in unison therewith but remain axially immovable, said member being adapted to engage said pawl when the latter is operatively disposed and capable of maintaining said pawl out of engagement with the ratchet teeth during a portion of each revolution of the boring bar, bevel gear teeth formed on the feed nut, a bevel gear mounted within the feed box and adapted to be placed in mesh with the bevel gear teeth formed on the feed nut, spring means normally maintaining said bevel gear out of engagement with the bevel gear teeth on the feed nut but capable of permitting said bevel gear to be placed in mesh with the bevel gear teeth on the feed nut and revolved to feed the boring bar, said bevel gear being formed with a shaft projecting outwardly through the wall of the feed box and formed at its end with a screw driver slot whereby it may be simultaneously pressed into engagement with the bevel gear teeth on the feed nut and rotated.

MAURICE C. COX.
RALPH B. RYAN.